(12) United States Patent
Moiyallah, Jr. et al.

(10) Patent No.: US 11,461,772 B2
(45) Date of Patent: Oct. 4, 2022

(54) DIGITAL WALLET CONVERSION ENGINE

(71) Applicant: Bank of America Corporation, Charlotte, NC (US)

(72) Inventors: Samuel M. Moiyallah, Jr., Newark, DE (US); Joseph Castinado, Northglenn, CO (US)

(73) Assignee: Bank of America Corporation, Charlotte, NC (US)

( * ) Notice: Subject to any disclaimer, the term of this patent is extended or adjusted under 35 U.S.C. 154(b) by 21 days.

(21) Appl. No.: 16/699,688

(22) Filed: Dec. 1, 2019

(65) Prior Publication Data

US 2021/0166223 A1 Jun. 3, 2021

(51) Int. Cl.
G06Q 20/38 (2012.01)
G06Q 20/36 (2012.01)
G06Q 20/10 (2012.01)

(52) U.S. Cl.
CPC ......... G06Q 20/381 (2013.01); G06Q 20/105 (2013.01); G06Q 20/3672 (2013.01); G06Q 20/3678 (2013.01); G06Q 2220/00 (2013.01)

(58) Field of Classification Search
CPC .................. G06Q 20/381–382; G06Q 20/4016
See application file for complete search history.

(56) References Cited

U.S. PATENT DOCUMENTS

| | | | | |
|---|---|---|---|---|
| 10,621,575 | B1* | 4/2020 | Belleville | G06Q 20/047 |
| 2015/0348017 | A1* | 12/2015 | Allmen | G06Q 20/401 |
| | | | | 705/76 |
| 2015/0356555 | A1* | 12/2015 | Pennanen | G06Q 20/382 |
| | | | | 705/71 |
| 2016/0071108 | A1* | 3/2016 | Caldera | G06Q 20/4016 |
| | | | | 705/75 |
| 2016/0092988 | A1* | 3/2016 | Letourneau | G06Q 20/363 |
| | | | | 705/66 |
| 2017/0092060 | A1* | 3/2017 | Toohey | G06F 16/254 |
| 2017/0109735 | A1* | 4/2017 | Sheng | H04L 9/3297 |
| 2019/0228407 | A1* | 7/2019 | Wu | G06Q 20/3823 |
| 2019/0272534 | A1* | 9/2019 | Griffith | G06Q 20/3678 |
| 2019/0318424 | A1* | 10/2019 | McWilliams | G06Q 20/227 |
| 2021/0012325 | A1* | 1/2021 | Harish | G06Q 20/3674 |

OTHER PUBLICATIONS

Davidson, Paul, "Digital wallets could become more widely accepted under new Citigroup service", Mar. 27, 2019, USA Today (Online) [Arlington]. (Year: 2019).*

* cited by examiner

Primary Examiner — Eric T Wong
(74) Attorney, Agent, or Firm — Weiss & Arons LLP

(57) ABSTRACT

Apparatus and methods are provided for a conversion engine that bridges between incompatible digital currency systems. The conversion engine may include a non-transitory memory of a computer system that includes machine executable instructions, that when executed by a processor on the computer system cause the processor to perform one or more functions of the conversion engine. The conversion engine may receive a request from a source digital wallet application and extract a destination digital wallet from the request. The conversion engine may locate currency referenced by the source digital currency application and verify a transactional integrity of the currency. The conversion engine may transfer the currency from the source digital wallet application to the destination digital wallet application.

8 Claims, 8 Drawing Sheets

700 →

Record 1: Transfer of $10 by $DWA_1$ to $DWA_3$ ⟵ 701

SourceName(Cust #1)

Receiver(Cust #2)

Amount ($10)

DestinationWalletID(12345)

CurrencyGenesisSerialnumber(2345-hash)

OriginWallet(SDW1) | Origin WalletID(12345)

Genesis date (MM/DD/YY)

Transaction Date (MM/DD/YY)

transaction_ID (xxxxxx)

Record 2: Transfer of $20 by $DWA_2$ to $DWA_3$ ⟵ 703

SourceName(Cust #3)

Receiver (Cust #2)

Amount ($20)

DestinationWalletID(12345)

MoneyGenesisSerialnumber(8765-hash)

OriginWallet(SDW2) | Origin WalletID(54321)

Genesis date (MM/DD/YYYY)

transaction Date (MM/DD/YYYY)

transaction ID (yyyyyy)

Record 3: Transfer of $5 by $DWA_3$ to $DWA_4$ ⟵ 705

SourceName(Cust #2)

Receiver (Cust #4)

Amount ($5)

DestinationWalletID(67891)

MoneyGenesisSerialnumber(2345-hash)

OriginWallet(SDW1) | Origin WalletID(12345)

FIG. 7A

```
Genesis date (MM/DD/YYYY)
transaction Date (MM/DD/YYYY)
transaction_ID (aaaaaa)
```
⎯705

```
Record 4: Transfer of $25 from DWA₃ to DWA₅
```
╭707

```
Record 4a: Transfer of $5 from DWA₃ to DWA₅

SourceName(Cust #2)
Receiver (Cust #5)
Amount ($5)
DestinationWalletID(55432)
MoneyGenesisSerialnumber(2345-hash)
OriginWallet(SDW1) | Origin WalletID(12345)
Genesis date (MM/DD/YYYY)
Transaction Date (MM/DD/YYYY)
transaction_ID (cccccc)
```
╭709

```
Record 4b: Transfer of $20 from DWA₃ to DWA₅

SourceName(Cust #2)
Receiver (Cust #5)
Amount ($20)
DesitnationWalletID(55432)
MoneyGenesisSerialnumber(8765-hash)
Originwallet(SDW2) | Origin WalletID(54321)
Genesis date (MM/DD/YYYY)
transaction Date (MM/DD/YYYY)
transaction_ID (vvvvvv)
```

FIG. 7B

DIGITAL WALLET CONVERSION ENGINE

FIELD OF TECHNOLOGY

This application describes apparatus and methods for digital payment processing technology.

BACKGROUND

As the world progresses towards a cashless payment society, there has been a rise in the various forms of emerging payment technologies. Such technologies may include digital wallet payment applications.

Many different digital payment applications are now available in the marketplace. However, each digital payment application typically uses its own proprietary technology, communication protocols, data structures and encryption.

There is a need for a hardware device that would bridge the gap between these various payment technologies and their respective proprietary ecosystems. Specifically, it would be desirable to provide a hardware device that is configured to seamlessly interact with multiple proprietary payment ecosystems at a merchant POS terminal. Accordingly, it is desirable to provide apparatus and methods for a DIGITAL WALLET CONVERSION ENGINE.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which:

FIGS. 7A and 7B show illustrative information in accordance with principles of the disclosure.

DETAILED DESCRIPTION

Figure 1:
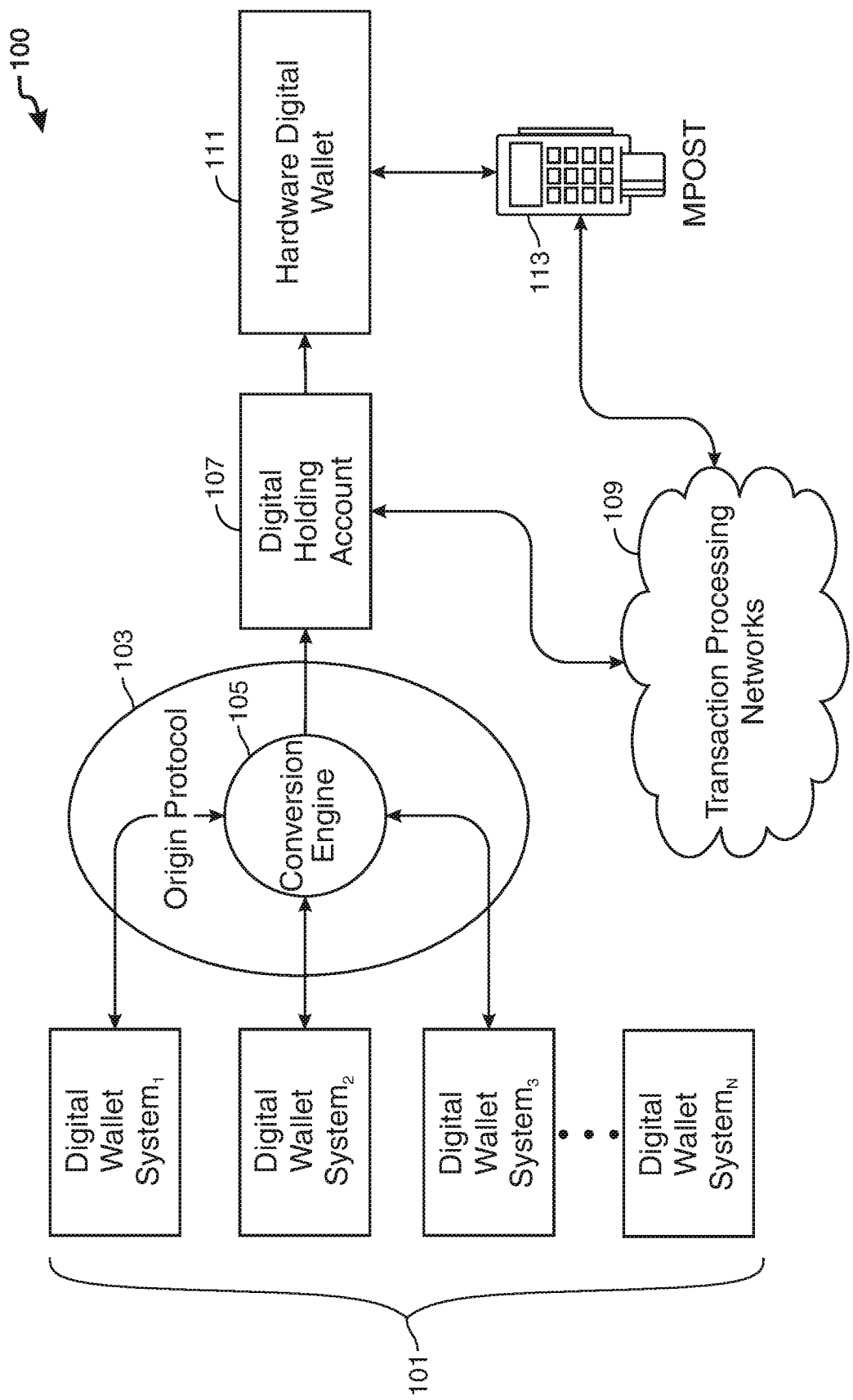
FIG. 1 shows an illustrative system in accordance with principles of the disclosure.

Apparatus for bridging between multiple digital wallet systems is provided. Apparatus may include a bridging protocol that orchestrates communication between otherwise incompatible digital wallet systems. The bridging protocol may include machine executable instructions running on a computing system. The executable instructions may be self-executing and trigger actions at specified times and/or based on reference to the occurrence or non-occurrence of a target action or event. Some or all of the computer executable instructions may be embodied in hardware or firmware components of a computing system.

The incompatible systems may be digital payment systems. Digital payment systems are typically configured to communicate between users of such systems. The users may run software and/or hardware (collectively, client equipment) that is compatible with the digital payment system.

Typically, a user operating client equipment compatible with one digital payment system is unable to transfer or receive currency from a user operating client equipment compatible with another digital payment system. Currency may include conventional currencies (e.g., USD, EUR, AUD, GBP, JPY, CAD). Currency may include cryptocurrencies (e.g., Bitcoin, Ethereum, Ripple, Bitcoin Cash, NEM, Litecoin, IOTA, NEO, Dash, Qtum, Monero and/or Dogecoin). A digital payment system may apply proprietary security requirements and formulate proprietary communications that are not understood by other digital payment systems and client equipment associated with those other digital payment systems.

The bridging protocol may receive a request. The request may be initiated by a source digital wallet system. The request may ask a digital wallet system to transfer currency to a destination digital wallet system. The source digital wallet system may operate using a first data or communication format. The first format may be proprietary. The destination digital wallet system may operate using a second data or communication format. The second format may be proprietary. The source digital wallet system may be unable to process information generated by the destination digital wallet system. The destination digital wallet system may be unable to process information generated by the source digital wallet system.

The bridging protocol may locate currency associated with the source digital wallet system. The currency may be identified in the transfer request. The currency may be associated with a digital wallet. A digital wallet may refer to electronic devices and programs used for making payments or purchases digitally, without presenting a physical credit card, debit card, or cash. A digital wallet may include an electronic device (e.g., smartphone) that stores payment information and the computer program (e.g., application) used to make the payment. A digital wallet may also hold other information, such as identity credentials, transportation tickets, event tickets, loyalty or gift credentials.

The bridging protocol may locate the currency via communication with a financial institution holding funds associated with the source digital wallet system. The bridging protocol may locate the currency via communication with a distributed ledger that maintains a record of funds associated with the source digital wallet system.

The bridging protocol may assign a unique identifier to the currency of the transfer request. The unique identifier may be an identifier that will be associated with the amount of currency as the currency moves from wallet to wallet within one or more digital payment systems. The bridging protocol may record the unique identifier in a distributed ledger. The bridging protocol may record attributes associated with a digital wallet or digital wallet system in the distributed ledger. Illustrative attributes may include the following:

Source Digital Wallet System
Recipient Digital Wallet System
Name of sender
Name of recipient
Amount
Currency Origin Digital Wallet System
Currency Origin Wallet ID
Source Wallet ID
Destination Wallet ID
Unique Identifier
Unique Identifier Assignment Date Current Transaction Date
Current Transaction ID
Source of Currency (e.g., Checking account, Cash deposit, paycheck, gift)
Institution holding source currency
Destination Institution
Identity of banking institution holding currency associated with a digital wallet (e.g., routing number)
Account Number at banking institution holding currency associated with a digital wallet The bridging protocol may validate a transactional integrity of the currency identified in the transfer request. Validating the transactional integrity may include generating a map of the flow of currency assigned the unique identifier. The map may include a flow of the currency from one digital payment system to another digital payment system. The map may include a flow between users of a single digital payment system.

Validating the transactional integrity may include determining an origin of the currency. The origin may be a record of the currency previously created by the bridging protocol. Validating the transactional integrity may include analysis of the map. The analysis may include determining whether the map includes repeating transfer patterns. Repeating transfer patterns may include currency transfers having common attributes.

For example, the mapping may show that the currency was included in multiple transfers that each involved a threshold number of common senders and recipients. Each transfer may utilize a different digital wallet system. Each transfer may be associated with currency earmarked for a particular use. Each transfer may be associated with a particular amount of currency. Each transfer may be associated with a particular geographic location.

The bridging protocol may be configured to validate the transactional integrity by identifying repeating transfer patterns in the mapping.

When the transactional integrity is above a threshold level (e.g., less than a threshold number of repeating transfer patterns), the bridging protocol may disseminate the transactional integrity to each digital payment system that participated in a transfer of the currency assigned the unique identifier. The bridging protocol may inform each digital wallet system for a given transaction is above the threshold level. The transactional integrity may be used to validate a source of currency. The transactional integrity may identify risk factors before accepting funds into a digital payment system. Such risk factors may include unusual or suspicious transfer patterns.

The bridging protocol may utilize a gossip communication bridging protocol to share the transaction integrity with other digital payment systems. A gossip communication bridging protocol may include a procedure or process of computer communication formulated based on the way epidemics spread. Such communication may include peer-to-peer communication without centralized control to ensure that the transactional integrity is received by each of the multiple digital payment systems.

When the transactional integrity is above a threshold level (e.g., less than a threshold number of repeating transfer patterns), the bridging protocol may initiate a transfer of the currency to the destination digital wallet system. The destination wallet system may utilize client equipment that is incompatible with the source digital wallet system. The bridging protocol may formulate data and communications that are compatible with the destination digital wallet system.

The bridging protocol may be configured to receive a transfer request from a first digital wallet system in first data format. The bridging protocol may be configured to transfer the currency to the destination digital wallet system in a second data format.

When the transactional integrity is below the threshold the bridging protocol may be configured to reject the transfer request. The transaction integrity may be below the threshold when the mapping of the currency flow includes a threshold number of repeating transfer patterns. The repeating transfer patterns may include multiple transfers that involve a target source digital wallet system and/or a specific user or device associated with the source digital wallet system. The repeating transfer patterns may include multiple transfers that involve a target destination digital wallet system and/or specific user or device associated with the destination digital wallet system.

The bridging protocol may disseminate a rejection of a transfer request to each digital currency system that transferred currency assigned the unique identifier. The bridging protocol may be configured to block future transactions that include currency having the unique identifier.

The bridging protocol may be further configured to locate a source account corresponding to the source digital wallet system. The source account may be located based on a geographic location associated with a source digital wallet. The source account may be located based on the unique identifier assigned to the currency. The source account may be located based on an identity of the sender of the currency. The sender may be a name or other identifying information assigned to the source digital wallet.

The bridging protocol may locate a destination account. The destination account may correspond to the destination digital wallet. The destination account may be located based on a location associated with the destination digital wallet. The destination account may be located based on the unique identifier assigned to currency. The destination account may be located based on an identity of the recipient of the currency. The destination may be a name or other identifying information assigned to the destination digital wallet.

The bridging protocol may debit the source account and credit the destination account. The credit and the debit may require access to currency transfer networks such as the Federal Reserve Wire Network ("Fedwire"), Clearing House Interbank Payments System ("CHIPS"), Society for Worldwide Interbank Financial Telecommunication ("SWIFT") and other suitable settlement networks known to those of skill in the art.

The bridging protocol may record the credit and debit in one or more distributed ledgers. The bridging protocol may be further configured to record the transactional integrity associated with a transfer in the distributed ledger. A distributed electronic ledger may store records in any suitable format. For example, records may be stored sequentially as they are generated, one after the other in a continuous ledger. Records may be stored in blocks, such as in a blockchain.

The distributed ledger may be a public or unpermissioned distributed ledger. A public distributed ledger does not have restriction on who may participate in the establishing a consensus for adding a new record. For example, records stored in a public distributed ledger may only be added to the ledger when systems that rely on the distributed ledger (e.g., digital payment system or systems responsible for maintaining the source or destination accounts) reach a consensus. The distributed ledger may use any suitable consensus algorithm such as Proof of Work, Proof of Stake or Practical Byzantine Fault Tolerance.

The distributed ledger may be a private or permissioned distributed ledger. A private distributed ledger may include restrictions on who may participate in the establishing a consensus for adding a new record.

The distributed ledger may utilize a combination of private and public participation to establish a consensus. For example, the distributed ledger may require a threshold number of private and/or public inputs before recording a transaction on the distributed ledger. Utilization of private entities may allow for achieving a consensus (or rejection) of a transaction faster than wholly public distributed ledgers.

The distributed ledger may be a blockchain. Records stored in a blockchain are organized in blocks. Each block may include multiple records. The blocks are linked to one another and secured using cryptography.

The bridging protocol may record one or more attributes associated with a currency transfer in a distributed ledger. Illustrative attributes may include a type of currency (e.g., USD, EUR, AUD, GBP, JPY, CAD), an amount of currency, a source digital wallet system and the destination digital wallet system. A distributed ledger may link digital currency transactions based common attributes shared by the transactions. The common attributes may be used to generate a map depicting flow the currency. Common attributes may include the unique identifier assigned to currency. Common attributes may include parties (e.g. source, destination) associated with a digital currency transaction.

The bridging protocol may be configured to move the currency from the source account into a digital holding account. The currency may be moved into the holding account after the bridging protocol receives the request for transferring the currency. The digital holding account may hold the currency until the bridging protocol validates the transactional integrity.

After validating the transactional integrity, the bridging protocol may transfer the currency to a destination digital wallet system. If the transaction integrity is below the threshold, the bridging protocol may transfer the currency back to the source digital wallet system. The bridging protocol may be configured to reject future transactions that include currency transferred back to a source digital wallet system. The bridging protocol may identify such currency based on a unique identifier assigned to the currency. The bridging protocol may be configured to inform the multiple digital currency systems of the rejection. The bridging protocol may inform the multiple digital payment application of the rejection using a gossip communication bridging protocol.

A bridging protocol for bridging between multiple digital currency systems is provided. The bridging protocol may be configured to receive a request initiated by a source digital wallet system. The source digital wallet system may use a first proprietary communication or data format. The source digital wallet system may request a transfer of an amount of currency to a destination digital wallet system. The destination digital wallet system may use a second proprietary communication or data format. The first and second proprietary formats may be incompatible with each other.

The bridging protocol may be configured to validate a transactional integrity of the amount. The bridging protocol may be configured to validate the transactional integrity using a unique identifier assigned to the amount. The unique identifier may have been assigned to the amount by the bridging protocol in connection with a previous transaction.

When the transactional integrity is above a threshold, the bridging protocol may disseminate the transactional integrity to multiple digital currency systems. The transactional integrity may be circulated among the digital currency systems using a gossip-type communication protocol. The bridging protocol may circulate the transactional integrity to each digital currency system that has received currency included in the amount and assigned a common unique identifier.

The bridging protocol may formulate communications with the source digital wallet system in the first format. Using the first format, the bridging protocol may debit an account or digital wallet controlled by the source digital wallet system. Using the first format, the bridging protocol may transfer the amount from an account or digital wallet controlled by the source digital wallet system to a digital holding account. Access to the digital holding account may be controlled by the bridging protocol.

The bridging protocol may formulate a transfer of the amount held in the digital holding account in the second proprietary format used by the destination digital wallet system. The bridging protocol may formulate any communication with the destination digital wallet system in the second proprietary format. For example, using the second format, the bridging protocol may credit an account or digital wallet controlled by the destination digital wallet system. Using the second format, the bridging protocol may effectuate a transfer the amount from an account or digital wallet controlled by the source digital wallet system to the destination digital wallet system. The bridging protocol may effectuate the transfer via a digital holding account. The digital holding account may be controlled by the bridging protocol.

When a transactional integrity of the currency identified in a transfer request is below the threshold, the bridging protocol may be configured to reject the transfer request. In some embodiments, when the transactional integrity is below the threshold, the bridging protocol may quarantine currency identified in a transfer request and held in the digital holding account.

Validation of the transactional integrity may be performed by a smart contract running on a distributed ledger. A smart contract may include machine executable instructions running on a computing system. The executable instructions may be self-executing and trigger actions at specified times and/or based on reference to the occurrence or non-occurrence of a target action or event. Some or all of the computer executable instructions may be embodied in hardware or firmware components of a computing system.

The bridging protocol and associated smart contracts may be run in cloud computing environments that include virtual software implementations. Such virtual software implementations may be designed to run on a physical hardware supplied externally by a hosting provider, a client, or other platform. The bridging protocol and associated smart contracts may include computer executable instructions for invoking user functionality related to communication, such as email, short message service ("SMS"), and voice input and speech recognition applications.

The bridging protocol and associated smart contracts may utilize computer-executable instructions, such as program modules, executed by a processor on the computing system. Generally, program modules include routines, programs, objects, components, data structures, etc. that perform particular tasks or implement particular abstract data types. The bridging protocol and associated smart contracts may be operational with distributed computing environments where tasks are performed by remote processing devices that are linked through a communications network. In a distributed computing environment, program modules may be located in both local and remote computer storage media including memory storage devices. The bridging protocol and associated smart contracts may rely on a network of remote servers hosted on the Internet to store, manage, and process data (e.g., "cloud computing" and/or "fog computing"). For example, smart contracts may be run on nodes that form a blockchain environment.

The amount included in a transfer request may include currency associated with a first unique identifier. The amount included in the transfer request may include currency associated with a second unique identifier. The unique identifier may allow the currency to be traced back to an originating source. Each transfer request that includes the currency may be associated with the unique identifier. For example, a transaction record associated with each transaction may include the unique identifier. The transaction record may be recorded in a distributed ledger.

The bridging protocol may be configured to execute a first validation routine for a first amount of the currency. The bridging protocol may be configured to execute a second validation routine for the second amount of the currency.

A first amount of the currency may be associated with a first identifier and a first transactional integrity. A second amount of the currency may be associated with a second identifier and a second transactional integrity. The bridging protocol may validate a comprehensive transactional integrity for the transfer request (first and second amounts). The comprehensive transactional integrity may be based on the first validation routine applied to the first amount. The comprehensive transactional integrity may be based on the second validation routine applied to the second amount.

The transactional integrity for the first amount may be above the threshold. The transactional integrity for the second amount may be below the threshold. The transactional integrity for the first amount may be below the threshold. The transactional integrity for the second amount may be above the threshold. The transactional integrity for the first and second amounts may be above the threshold. The transactional integrity for the first and second amounts may be below the threshold.

The bridging protocol may be configured to transfer the first amount to the destination digital wallet system and reject the request to transfer the second amount. For example, the transaction integrity for the first amount may be above the threshold and the transactional integrity for the second amount may be below the threshold.

In some embodiments, when the transactional integrity associated with the first or second amounts is below the threshold, the bridging protocol may be configured to reject the transfer of the first and second amounts. The bridging protocol may be configured to propagate the rejection of a request to each of the multiple digital wallet systems. The bridging protocol may propagate the rejection to each of the multiple digital wallet systems in a proprietary format usable by each digital wallet system.

A transfer request may be a first request to transfer a first amount from a source digital wallet system to a destination digital wallet system. The bridging protocol may be configured to receive a second request. The second request may be initiated by the destination digital wallet system that received the first amount from the source digital wallet system. The destination digital wallet system may request a transfer of a second amount of currency. The second amount of currency may be larger amount than the first amount received from the source digital wallet system.

The bridging protocol may be configured to validate the transactional integrity of the second request. The bridging protocol may classify an amount of currency as being included in the first or second amount using a first-in-first-out ("FIFO") currency management.

For example, User1 may send $10 to Recipient1. A digital wallet of User1 may operate using digital wallet system A. A digital wallet of Recipient1 may operate using digital wallet system B. User2 may send $20 to Receipient1. A digital wallet of User2 may operate using digital wallet system C. The bridging protocol may allow Recipient1 to receive both transfers despite each of User1, User2 and Recipient1 using different digital currency systems. In this case, the bridging protocol may ensure that Recipient1's digital wallet operating on digital wallet system B shows a total balance of $30.

The bridging protocol may assign a first unique identifier to the $10 transferred by User1 to Recipient1. The bridging protocol may assign a second unique identifier to the $20 transferred by User2 to Recipient1.

Recipient1 may then initiate a transfer of a sub-amount of the currency to Recipient2. A digital wallet of Recipient2 may operate using digital wallet system D. Recipient1 may transfer sub-amount $5 to Recipient2 out of the $30 balance. The bridging protocol may use FIFO currency management to determine the unique identifier associated with the transfer from Recipient1 to Recipient2.

For example, using FIFO, the bridging protocol may determine that the $10 Recipient1 received from User1 was "first in" to Recipient1's digital wallet. Therefore, when Recipient1 sends sub-amount $5 to Recipient2, the bridging protocol may assume that the sub-amount $5 is associated with the unique identifier assigned to the transfer originally received from User1.

Continuing with this example, the bridging protocol may register a balance for Recipient2 in digital wallet system D of $5. The bridging protocol may record Recipient2's balance (e.g., in a distributed ledger) as being associated with the same unique identifier assigned to the currency ($10) received by Recipient1 from User1.

Recipient1 may have a balance of $25 in digital wallet system B. Using a FIFO implementation, the bridging protocol may classify Recipient1's balance as including sub-amount $5 from User1 and sub-amount $20 from User2. Recipient1 may now request a transfer of $25 to Recipient3. The bridging protocol may treat the transfer to Recipient3 as including sub-amount $5 having the unique identifier assigning to currency received from User1 and sub-amount $20 having the unique identifier assigning to currency received from User2.

Methods for managing transfers of currency between multiple digital payment systems are provided. The multiple digital wallet systems may be incompatible with each other. Incompatibility may include a first digital wallet system that cannot receive or transfer funds directly to a second digital wallet system. Communication generated by the first digital wallet system may not be understood by the second digital wallet system. Communications generated by the second digital wallet system may not be understood by the first digital wallet system.

Methods may include transferring a first amount of currency from a source digital wallet system to a first destination digital wallet system. Methods may include assigning a unique identifier to the first amount of currency. The unique identifier may correspond to a source of the first amount.

Methods may include receiving a request to transfer a second amount of currency from the first destination digital wallet system to a second destination digital wallet system. Methods may include validating the transactional integrity of the second amount. Validating may include generating a mapping of movement of the first amount among the multiple digital wallet systems. Using the example provided above, the mapping may include a flow of currency from User1→Recipient1→Recipient2. Using the example provided above, the mapping may include a flow of currency from User2→Recipient1→Recipient3.

Methods may include determining whether the validating yields a transactional integrity that is above or below a threshold level. The threshold level may be determined based on indicators developed when assessing transfers of currency between conventional bank accounts. The threshold level may be determined based on location of the transferee, location of the transferor, attributes of prior transfers associated with the unique identifier assigned to currency included in currency transfer.

Methods may include identifying repeating transfer patterns in the mapping. Repeating transfer patterns may indicate that a particular digital wallet or digital wallet system has participated in a threshold number of transactions involving the same currency. The threshold number of transactions may correspond to a disproportionate number of transactions associated with a target digital wallet or digital wallet system compared to the number of currency transfers processed by the bridging protocol on behalf of other digital wallets or digital wallet systems.

Repeating transfer patterns may indicate that currency is disproportionately flowing into or out of a particular digital wallet or digital wallet system. Based on attributes associated with a digital wallet or digital wallet system, the repeating transfer patterns may indicate that currency is disproportionately flowing into or out of a particular geographic region.

When the mapping includes less than a threshold number of repeating transfer patterns, the transactional integrity register as being above a threshold level. When the transaction integrity is above the threshold level, methods may include transferring the second amount to the second destination digital wallet system. When the threshold integrity is below the threshold level, methods may include imposing a time delay on the transferring of the second amount to the second destination digital wallet system. The time delay may be minutes, hours, days, months or any suitable duration of time.

The time delay may provide additional time to investigate the currency transfer before transferring the currency out of a digital holding account to a destination digital wallet.

Methods may include attempting to conduct additional analysis of the mapping during the time delay. If the additional analysis raises the transactional integrity above the threshold, the bridging protocol may execute the transfer request. If the additional analysis does not raise the transactional integrity above the threshold prior to expiration of the time delay, the transfer request may time-out.

After a transfer request times-out, the transferor may be required to submit a new transfer request. In some embodiments, the bridging protocol may determine that currency is available that would generate a transaction integrity above the threshold level. The bridging protocol may substitute the currency (or amount of the currency) that is needed to complete the transfer request with other currency having a transaction integrity above the threshold level. For example, using FIFO, the bridging protocol attempt to use currency that was provided to the transferor immediately prior the currency associated with the transactional integrity below the threshold level.

The bridging protocol may flag currency associated with a specific unique identifier that is associated with a transactional integrity below the threshold level. When currency is flagged, the bridging protocol may reject any future transfer requests that include the flagged currency.

Methods may include informing each digital payment system of the time delay. Methods may include informing each digital payment system of flagged currency. Methods may circulate a message to each digital payment system using a gossip bridging protocol.

Apparatus for a conversion engine is provided. The conversion engine may include a client-side application that resides on an end users mobile device. The client side application may capture currency transfer requests transmitted by a source digital wallet application. The client-side application may forward the currency transfer request to a bridging protocol. The client-side application may translate the currency transfer request into a data structures and a communication format that may be processed by the bridging protocol.

The conversion engine may be a component of a bridging protocol that between multiple, siloed digital currency systems. The conversion engine may include a server-side application that resides within bridging protocol. The conversion engine may be configured to receive a request from a source digital wallet application. The source digital wallet application may be associated with a source digital wallet system. The source application may provide an interface for accessing currency transfer functionality provided by the source digital wallet system.

In some embodiments, the conversion engine may be configured to receive currency transfer requests submitted by a source digital wallet application. The conversion engine may perform like a virtual destination digital wallet application associated with the source digital wallet system.

The conversion engine may be configured to transmit a currency to a destination digital wallet application. The conversion engine may perform like a virtual source digital wallet application associated with a destination digital wallet system. The conversion engine may convert currency transfer requests received from a source digital wallet application into a currency transfer request submitted by a destination digital wallet application.

The conversion engine may extract, from the request, a destination digital wallet application. The destination digital wallet application may be associated with a destination digital wallet system. The destination application may provide an interface for accessing currency transfer functionality provided by the destination digital wallet system.

The conversion engine may locate currency referenced by the source digital currency application. The conversion engine may locate the currency at a source account holding the currency. The conversion engine may be configured to communication with banking systems for accessing bank accounts.

The conversion engine may verify a transactional integrity of the currency. The conversion engine may generate destination computer executable instructions for transferring the currency to the destination digital wallet system via the destination application. In some embodiments, the conversion engine may generate a virtual instance of the destination digital wallet application. The conversion engine may utilize the virtual destination digital wallet application to communication with the destination digital wallet system.

The conversion engine may submit the destination computer executable instructions to the virtual instance of the destination digital wallet application. The destination application may execute the computer executable instructions using the virtual destination digital wallet application and thereby transfer the currency from the source digital wallet application to the destination digital wallet application.

The conversion engine may be further configured to determine that the source digital wallet application utilizes a first data and/or communication format to interact with the source digital wallet system. The conversion engine may determine that the destination digital wallet application utilizes a second data and/or communication format to interact with the destination digital wallet system.

The conversion engine may obtain the currency from the source digital wallet application using the first data/communication format. The conversion engine may transfer the currency to the destination digital wallet application using the second data format. The conversion engine may only transfer the currency to the destination digital wallet application after verifying that the transactional integrity of the currency is above a threshold. The conversion engine may be configured to return the currency to the source digital wallet application when the transactional integrity of the currency is below the threshold.

The conversion engine may be configured to receive an electronic confirmation (in the second data/communication format) that the currency has been received by the destination digital wallet application and associated digital wallet system.

The conversion engine may generate and transmit an electronic confirmation in the first data/communication format to the source digital wallet application/system.

The conversion engine may validate the transactional integrity. In some embodiments, the conversion engine may pass responsibility for evaluating the transactional integrity to a standalone module part of the bridging protocol. The conversion engine itself may be a component of the bridging protocol. The transactional integrity may be evaluating by mapping a path of the currency from a pre-defined origin to the source digital wallet application. The pre-defined origin may be determined based on a first date a unique identifier was assigned to the currency by the bridging protocol.

The conversion engine may search for any repeating currency transfer patterns linking a target source digital wallet application and a target destination digital wallet application. The target source digital wallet application may not be the same source digital wallet application that submitting the currency transfer request being examined. The destination digital wallet application may not be the same destination digital wallet application specified in the currency transfer request being examined.

When the number of repeating currency transfer patterns is below a threshold number, the conversion engine may submit the destination computer executable instructions to the virtual instance of the destination digital wallet application. In some embodiments, the conversion engine may not formulate the destination computer executable instructions until after evaluating the transactional integrity. When the number of repeating transfer patterns is above the threshold number, the conversion engine may reject the currency transfer request.

The conversion engine may be configured to disseminate the detected repeating transfer patterns to the source and destination digital wallet systems. The conversion engine may be configured to disseminate the repeating transfer patterns to each of the digital wallet applications identified in the mapping. The conversion engine may be configured to disseminate the repeating transfer patterns to each of the multiple, siloed digital currency systems. The conversion engine may disseminate the repeating transfer patterns using a gossip communication protocol.

The conversion engine may be configured to locate a source account holding the currency referenced by the source digital wallet application. The conversion engine may be configured to locate a destination account for holding the currency on behalf of the destination digital wallet application. The conversion engine may formulate computer executable instruction for debiting the source account and crediting the destination account. The conversion engine may formulate a first set of computer executable instructions that are configured to be executed by any suitable currency transfer network.

Apparatus for a conversion engine is provided. The conversion engine may facilitate bridging between incompatible digital currency applications and systems. The conversion engine may be a component of a bridging protocol. The conversion engine may receive a currency transfer request initiated by a source digital wallet application. The source application may use a first data/communication format to communicate with a source digital wallet system. The source application may request a transfer an amount of currency to a destination. The destination may be specified using an email address, geographic address, phone number, name, social media account, or any other suitable identifier.

The destination may correspond to an account associated with a user of a destination digital wallet system. The destination system may provide a destination digital wallet application for accessing the destination digital wallet system. The source application may not be compatible with the destination system. For example, the destination application/system may use a second data/communication format that is incompatible with the first data/communication format used by the source system/application. The conversion engine may enable the source application/system to transfer currency to the destination application/system.

The conversion engine may validate a transactional integrity of the amount. The conversion engine may validate the transaction integrity based on a plurality of unique identifiers previously assigned to the amount. The unique identifiers may be assigned to the amount by the conversion engine or any other component of the bridging protocol.

When the transactional integrity is above a threshold, the conversion engine may generate computer executable instructions in the second data/communication format that transfer the amount to the destination digital wallet application. When the transactional integrity is below the threshold, the conversion engine may reject the currency transfer request.

The conversion engine may be configured to propagate the transactional integrity to any digital wallet system that participated in any transaction that included the currency. The conversion engine may utilize a gossip communication protocol to propagate the transactional integrity. The digital currency system that participated in transactions that included the currency may be identified based on records stored in a distributed ledger. For example, the conversion engine may identify records stored in the distributed ledger that include currency assigned a unique identifier. Validating the transactional integrity may be performed by a smart contract running on the distributed ledger. For example, the smart contract may be configured to detect transfer patterns based on a data (e.g., transaction records associated with a unique identifier) stored in the distributed ledger.

The amount of currency specified by the source application in the currency transfer request may include a first sub-amount and a second sub-amount. The first sub-amount may be currency associated with a first unique identifier. The second sub-amount may be currency associated with a second unique identifier. The conversion engine may execute a first validation routine to validate the transactional integrity for the first sub-amount. The conversion engine may execute a second validation routine to validate the transactional integrity of the second sub-amount.

The first transactional integrity may be above a threshold. The second transactional integrity may be below the threshold. In such a scenario, the conversion engine may be configured to transfer the first sub-amount to the destination digital wallet application and reject the request to transfer the second sub-amount.

The first transactional integrity may be above the threshold. The second transactional integrity may be below the threshold. In such a scenario, the conversion engine may be configured to reject the transfer of the first and second sub-amounts.

The conversion engine may propagate a rejection of a currency transfer request (or specific sub-amount) to multiple digital wallet systems in a proprietary data/communication format used by each digital wallet system.

The conversion engine may be configured to receive two or more currency transfer requests. A first request may be initiated by a source application and request a transfer of a first amount of currency to a destination application. A second request may be initiated by the destination digital wallet application and request a transfer of a second amount of currency to another digital wallet application. The second amount of currency may be larger than the first amount.

The conversion engine may validate the transactional integrity of the second request using a first-in-first-out ("FIFO") currency management scheme. The FIFO currency management scheme may determine, based on the first amount of currency received by the destination application, which currency is being transferred in the second request. The FIFO currency management may determine which currency is being transferred based on one or more unique identifiers associated with the currency.

Methods for managing transfers of currency between multiple incompatible digital payment systems are provided. Methods may include transferring a first amount of currency from a source digital wallet application to a first destination digital wallet application. Methods may include receiving a request to transfer a second amount of currency from the first destination digital wallet application to a second destination digital wallet application.

Methods may include validating a transactional integrity of the second amount. Validation the transaction integrity may include mapping movement of the first amount through the multiple digital payment systems. Methods may include searching for repeating transfer patterns within the mapping.

When a detected number of repeating transfer patterns is below a threshold number, methods may include transferring the currency to the second destination digital wallet application. When the detected number of repeating transfer patterns is above the threshold number, methods may include imposing a time delay on the transferring of the second amount to the second destination digital wallet application.

Methods may include generating a virtual instance of the second destination digital wallet application. Methods may include using the virtual instance of the second destination digital wallet application to transfer the currency to the second destination digital wallet application. The virtual instance of the second destination application may be configured to interact with the destination digital wallet system using a proprietary data/communication format.

Methods may include, during the time delay, receiving an override instruction from the source digital wallet application. In response to receiving the override instruction, methods may include transferring the currency to the second destination digital wallet application. The override may indicate that the source digital wallet system is disregarding the detected repeating transfer patterns.

Apparatus and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method may include steps shown in connection with any other illustrative method.

Apparatus may omit features shown and/or described in connection with illustrative apparatus. Apparatus embodiments may include features that are neither shown nor described in connection with illustrative apparatus. Features of illustrative apparatus may be combined. For example, an illustrative apparatus embodiment may include features shown or described in connection with another illustrative apparatus/method embodiment.

FIG. 1 shows illustrative system 100. System 100 includes digital wallet systems 101. Digital wallet systems 101 may each be incompatible with each other. For example, digital payment wallet $system_1$ may be unable to transfer currency to digital wallet $system_2$. Digital wallet $system_2$ may be unable to receive currency from digital wallet $system_3$.

System 100 includes bridging protocol 103. Bridging protocol 103 may receive transfer requests generated by one or more of digital wallet systems 101. The transfer requests may be received from a digital wallet application that interfaces with a particular digital wallet system. A digital wallet application may be run on a mobile device of an end user the particular digital wallet system.

In response to receiving a transfer request from digital wallet systems 101, bridging protocol 103 may utilize conversion engine 105. Conversion engine 105 may convert a transfer request into a format that may be processed by bridging protocol 103. Conversion engine 105 may convert a transfer request received from one of digital wallet systems 101 into a format that may be processed by different one of digital wallet systems 101. In some embodiments, conversion engine 105 may reside entirely within bridging protocol 103.

In some embodiments, conversion engine 103 may include a client-side application that runs on an end user's mobile device. Bridging protocol 103 may include a server-side application of conversion engine 105. The client-side application of conversion engine 105 may intercept a transfer request formulated by a source digital wallet application. The client-side application may convert a transfer request into a format usable by bridging protocol 103.

Conversion engine 105 may be configured to forward currency to digital holding account 107. After bridging protocol 103 receives the converted transfer request, a server-side application of conversion engine 105 may generate instructions for transferring currency identified in the transfer request from a source account associated with source digital wallet system to digital holding account 107. After bridging protocol 103 receives the converted transfer request, a server-side application of conversion engine 105 may generate instructions for transferring currency identified in the transfer request from digital holding account 107 to a destination digital wallet system.

Digital holding account 107 may hold currency received from one or more of digital wallet systems 101. Digital holding account 107 may hold the currency while a transactional integrity of the currency is being evaluated by bridging protocol 103.

When a transactional integrity associated with currency is above a threshold level, the currency may be accessible by hardware digital wallet 111. Hardware digital wallet 111 may be controlled by one or more digital wallet applications. The digital wallet applications may be stored on hardware digital wallet 111. Hardware digital wallet 111 may include near field communication ("NFC") functionality. Hardware digital wallet 111 may receive or initiate transfers of currency via NFC communication.

Hardware digital wallet 111 may communicate with merchant POS terminal ("MPOST") 113. Hardware digital wallet 111 may use NFC to communicate with MPOST 113. Hardware digital wallet 111 may provide credentials for accessing currency stored in digital holding account 107 to MPOST 113. MPOST 113 may be configured to initiate a transaction based on credentials provided by hardware digital wallet 111. FIG. 1 shows that MPOST 113 may submit the credentials to transaction processing networks 109.

Transaction processing networks 109 may link acquirers, issuers and other transaction participants that process transactions. For example, transaction processing networks 109 may receive an authorization decision from an issuer and transmit the authorization decision to MPOST 113. In response to receiving a granted authorization decision, MPOST 113 may release a desired product to the user of hardware digital wallet 111. In response to receiving a denial authorization decision, MPOST 113 may prompt the user to provide an alternative payment method (e.g., cash or check).

Transaction processing networks 109 (in communication with other transaction participants) may settle transactions between the issuer and the acquirer, digital payment applications or any parties to a transaction. A transaction settlement process may include a transfer of funds between two or more transaction participants. A settlement network may transfer the funds between transaction participants. Illustrative settlement networks may include Fedwire or other suitable settlement networks. The settlement network may include any network linking one or more accounts of transaction participants.

System 100 shows that transaction processing networks 109 may transfer funds into digital holding account 107. Funds transferred into digital holding account 107 may be assigned a unique identifier by bridging protocol 103. In some scenarios, funds received by bridging protocol 103 may already be associated with a unique identifier previously assigned by bridging protocol 103.

Figure 2:
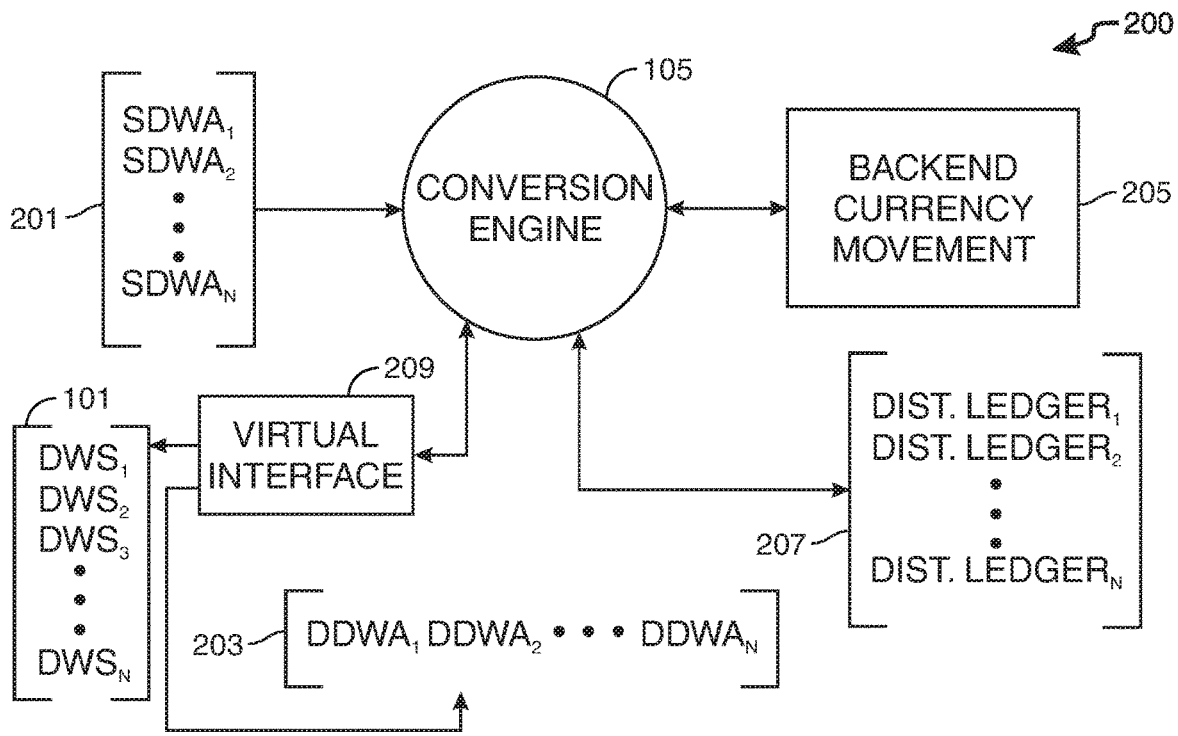
FIG. 2 shows an illustrative system in accordance with principles of the disclosure.

FIG. 2 shows illustrative system 200. System 200 includes source digital wallet applications ("SDWA") 201. Each of SDWA 201 may be an end-user application for interfacing with at least one of digital wallet systems 101. A user of SDWA 201 may submit a request for transferring currency to one or more of destination digital wallet applications ("DDWA") 203. Each of DDWA 203 may be end-user application for interfacing with at least one of digital wallet systems 101.

The currency transfer request submitted by SDWA 201 may be intercepted by conversion engine 105 (shown in FIG. 1). In response to intercepting a transfer request from SDWA 201, conversion engine 105 may evaluate a transactional integrity of currency associated with the request. For example, conversion engine 105 may map a flow of the currency. Conversion engine 105 may generate the map using records stored in distributed ledgers 207. Distributed ledgers 207 may include records of transactions processed by bridging protocol 103. Distributed ledgers 207 may include ledgers maintained by one or more of digital wallet systems 101.

Conversion engine 105 may generate the map using information stored in records associated with backend currency movement 205. Backend currency movement 205 may include records of transactions corresponding to underlying account activity triggered by a currency transfer. For example, digital wallet systems 101 may not have direct access to underlying bank accounts. Digital currency systems 101 may submit transfer requests to banking institutions that have access to the underlying bank accounts that correspond to the source/destination identified in a currency transfer request.

Backend currency movement 205 may include records of transactions processed by MPOST 113 and transaction processing networks 109. Conversion engine 105 may correlate records stored in distributed ledgers 207 with records associated with backend currency movement 205. The correlating may be performed based on common attributes included in each set of records.

For example, a unique identifier assigned to currency stored in a record on distributed ledgers 207 may identify a source name associated with currency. The source name may also correspond to a name on an account stored in records generated by backend currency movement 205.

System 200 also includes virtual interfaces $DDWA_{1-N}$ 209. Virtual interfaces $DDWA_{1-N}$ 209 may be generated by conversion engine 105. Conversion engine 105 may generate one or more of virtual interfaces $DDWA_{1-N}$ 209 to access a digital wallet system 101. In some embodiments conversion engine 105 may generate one or more of virtual interfaces $DDWA_{1-N}$ 209 to communicate with DDWA 203. Conversion engine 105 may generate virtual interfaces $DDWA_{1-N}$ 209 based on information received from SDWA 201. Conversion engine 105 may generate virtual interfaces $DDWA_{1-N}$ 209 based on evaluation of a transactional integrity of currency identified in a transfer request received from SDWA 201.

Virtual interfaces $DDWA_{1-N}$ 209 may bridge incompatibility between SDWA 201 and DDWA 203. Conversion engine 105 may transfer currency from SDWA 201 to DDWA 203 via virtual interfaces $DDWA_{1-N}$ 209. Conversion engine 105 may only transfer currency from SDWA 201 to DDWA 203 when validation of a transactional integrity is above a threshold level.

Figure 3:
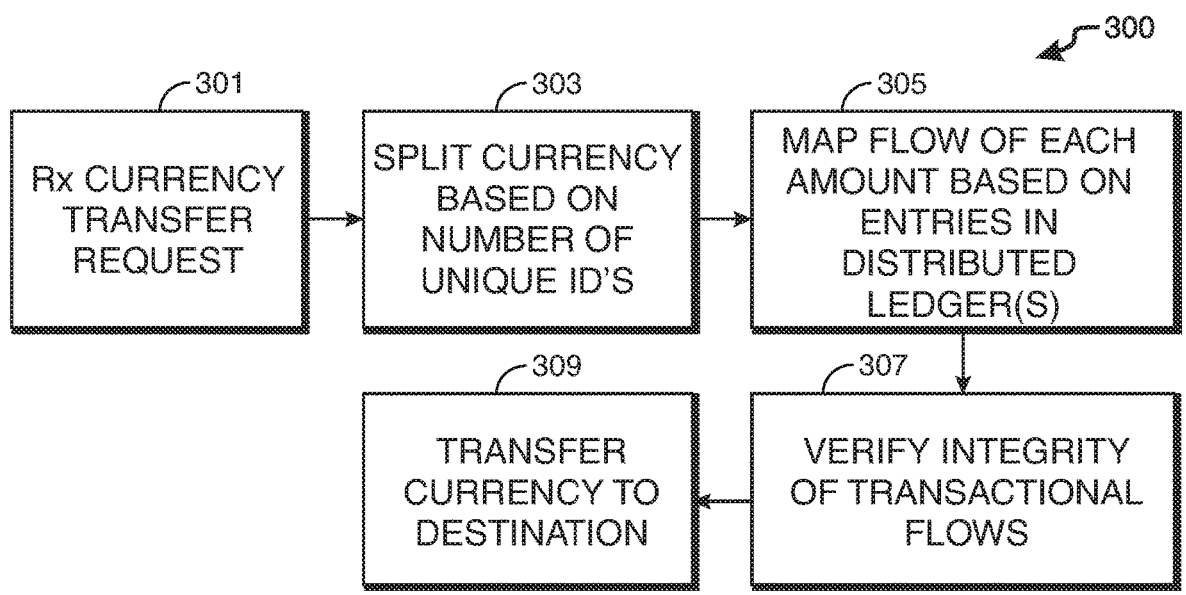
FIG. 3 shows an illustrative process in accordance with principles of the disclosure.

FIG. 3 shows illustrative process 300. One or more of the steps of the process illustrated in FIG. 3 may be performed by a "system." The "system" may include one or more of the features of the apparatus shown in FIGS. 1-2 and/or any other suitable device or approach. The "system" may be provided by an entity. The entity may be an individual, an organization or any other suitable entity.

Process 300 begins at step 301. At step 301 the system receives a currency transfer request. The request may be received from a source digital wallet application (e.g., SDWA 201) asking to transfer an amount of currency to a destination digital wallet application (e.g., DDWA 203). At step 303, the system splits currency based on the number of unique identifiers of the currency associated with the received transfer request.

For example, a source digital wallet application may request that an amount of currency be transferred to a destination digital wallet application. The requested amount of currency may include currency received by the source digital wallet application from multiple other sources. Each amount of currency received from the other sources may be assigned a different unique identifier.

At step 305, the system maps a flow of each amount of the currency assigned a different unique identifier. The flows may be mapped based on entries in one or more distributed ledgers (e.g., distributed ledgers 207). At step 307, the system validates a transactional integrity of the currency using on the mapping. Validating the transactional integrity may include determining an origin of each amount of currency included in the received transfer request. Validating the transactional integrity may include confirming that security of a source digital wallet application/system associated with the origin has not been compromised. Validating the transactional integrity may include determining that security of a destination digital wallet application/system has not been compromised.

At step 309, when the transactional integrity is above a threshold level, the system transfers currency to destination digital wallet application. The transfer to the destination digital wallet application may include formulating communications that are compatible with the digital wallet system of the destination digital wallet application identified in the transfer request received at step 301.

Figure 4:
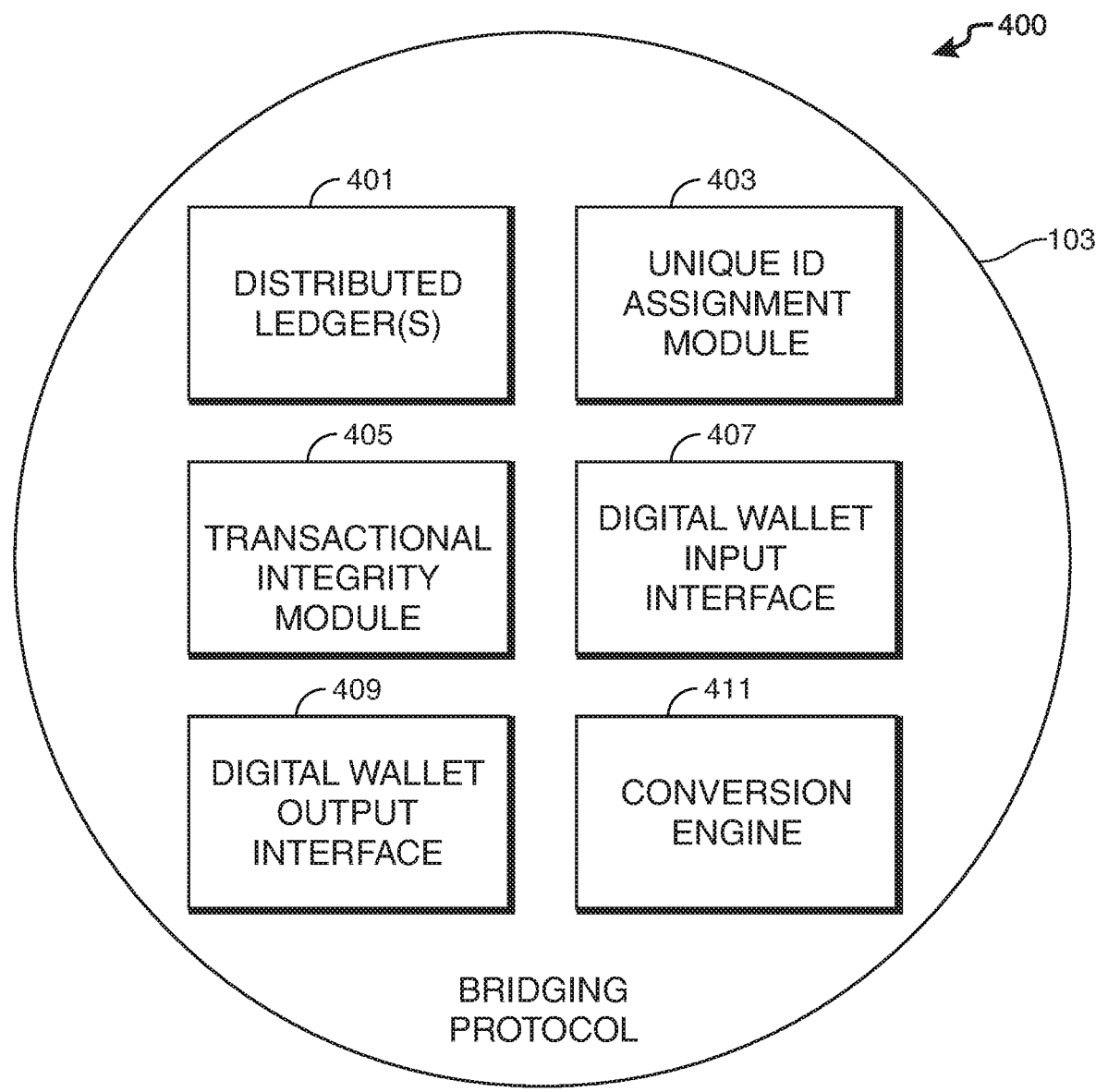
FIG. 4 shows illustrative system components in accordance with principles of the disclosure.

FIG. 4 shows system 400. System 400 shows illustrative sub-components of bridging protocol 103. System 400 includes distributed ledger(s) 401. Distributed ledger(s) 401 may be used by bridging protocol 103 to store records of each transfer processed by bridging protocol 103. Distributed ledger(s) 401 may be used by digital wallet systems 101 to store transactions processed by each of those systems. Bridging protocol 103 may record, for each transfer request received from digital wallet systems 101, the unique identifier assigned to currency identified in the transfer request.

System 400 includes unique identifier assignment module 403. Assignment module 403 may determine whether a currency amount identified in transfer request received by bridging protocol 103 has already been assigned a unique identifier. Assignment module 403 may split identified currency into amounts. For example, assignment module 403 may use FIFO to assign a unique identifier to different amounts of currency associated with a transfer request. Any suitable accounting method may be used to assign a unique identifier to currency identified in a transfer request. Other suitable accounting methods may include last-in-first-out ("LIFO") currency management.

System 400 includes transactional integrity module 405. Transactional integrity module 405 may generate maps showing movement of currency through one or more of digital wallet systems 101. Transactional integrity module 405 may generate maps showing movement of currency flowing between different digital wallet systems 101.

Transactional integrity module 405 may generate heat maps based on one or more unique identifiers assigned to currency in a transfer request. The heat maps may show digital wallet applications and systems (source or destinations) that have been in involved in transactions that include the currency assigned the unique identifiers associated with currency identified a currency transfer request. The heat maps may show repeating patterns detected in the transactions. The patterns may show that relatively large amounts of the currency have been received by particular source or destination digital wallet systems or applications. Such digital wallet systems and applications may be flagged for suspicious activity.

Heat maps generated by transactional integrity module 405 may be compared to heat maps or other transaction information for an entity or specific end user. Other transaction information may include transaction records generated by back end currency movement 205 (shown in FIG. 2) or transaction processing network 109 (shown in FIG. 1). If heat maps generated by transaction integrity module 405 show transaction activity for currency that is disproportionate to the transaction information associated with others data sources, the transactional integrity for the currency may be classified as being below a threshold level.

System 400 includes conversion engine 411. Conversion engine 411 may include a client side application that resides on an end users mobile device. Conversion engine 411 may include a server-side application that resides within bridging protocol 103. Conversion engine 411 may include one or more features of conversion engine 105 (shown in FIG. 1).

System 400 includes digital wallet input interface 407. Interface 407 may be used to receive transfer requests from SDWA 201 (shown in FIG. 2). Interface 407 may be generated by conversion engine 411. System 400 may include an interface 400 for communicating with each of SDWA 201. Interface 407 may transfer currency from SDWA 201 to digital holding account 107.

In some embodiments, interface 407 may be generated by a client-side application of conversion engine 411. Interface 407 may be generated by a server-side application of conversion engine 411.

System 400 includes digital wallet output interface 409. Interface 409 may be generated by conversion engine 411. Interface 409 may be used to initiate transfer requests with DDWA 203 (shown in FIG. 2). System 400 may include an interface 409 for communicating with each of DDWA 203. Interface 409 may transfer currency from digital holding account 107 to DDWA 203.

In some embodiments, interface 409 may be generated by a client-side application of conversion engine 411. In some embodiments, interface 409 may be generated by a server-side application of conversion engine 411.

System 400 may include one or more integrated circuits which may be configured to perform any suitable logical operation. System 400 may include I/O circuitry, which may include a transmitter device and a receiver device and may interface with fiber optic cable, coaxial cable, telephone lines, wireless devices, PHY layer hardware, a keypad/display control device or any other suitable encoded media or devices. The I/O circuitry may include a microphone, button and/or touch screen which may accept user provided input. The I/O circuitry may include one or more of a speaker for providing audio output and a video display for providing textual, audiovisual and/or graphical output. The video display may include one or more organic light emitting diodes.

I/O circuitry may include a wireless communication circuit. The wireless circuit may provide Wi-Fi, NFC, Bluetooth, satellite, cellular or any other suitable mode of wireless communication. Wi-Fi may include passive Wi-Fi with lower power consumption than typical Wi-Fi. System 400 may include counter timers, real-time timers, power-on reset generators or any other suitable peripheral devices. System 400 may include a processor, which may compute data structural information, structural parameters of the data, generate currency flow maps or detect patterns in the maps. The processor may include sub-components for controlling operation of system 400 and its associated modules.

System 400 may include machine-readable memory. The memory may store applications such as an operating system, application programs, web browser and a database. Application programs may include computer executable instructions for invoking user functionality related to communication, such as email, short message service ("SMS"), and voice input and speech recognition applications. Application programs may utilize one or more algorithms that control prompts presented at a merchant POS terminal, generate virtual interfaces, process received executable instructions, generate executable instructions, perform power management routines or other suitable tasks.

Components of system 400 may be coupled together by a system bus or other interconnections and may be present on one or more circuit boards. In some embodiments, the components may be integrated into a single chip. The chip may be silicon-based.

Figure 5:
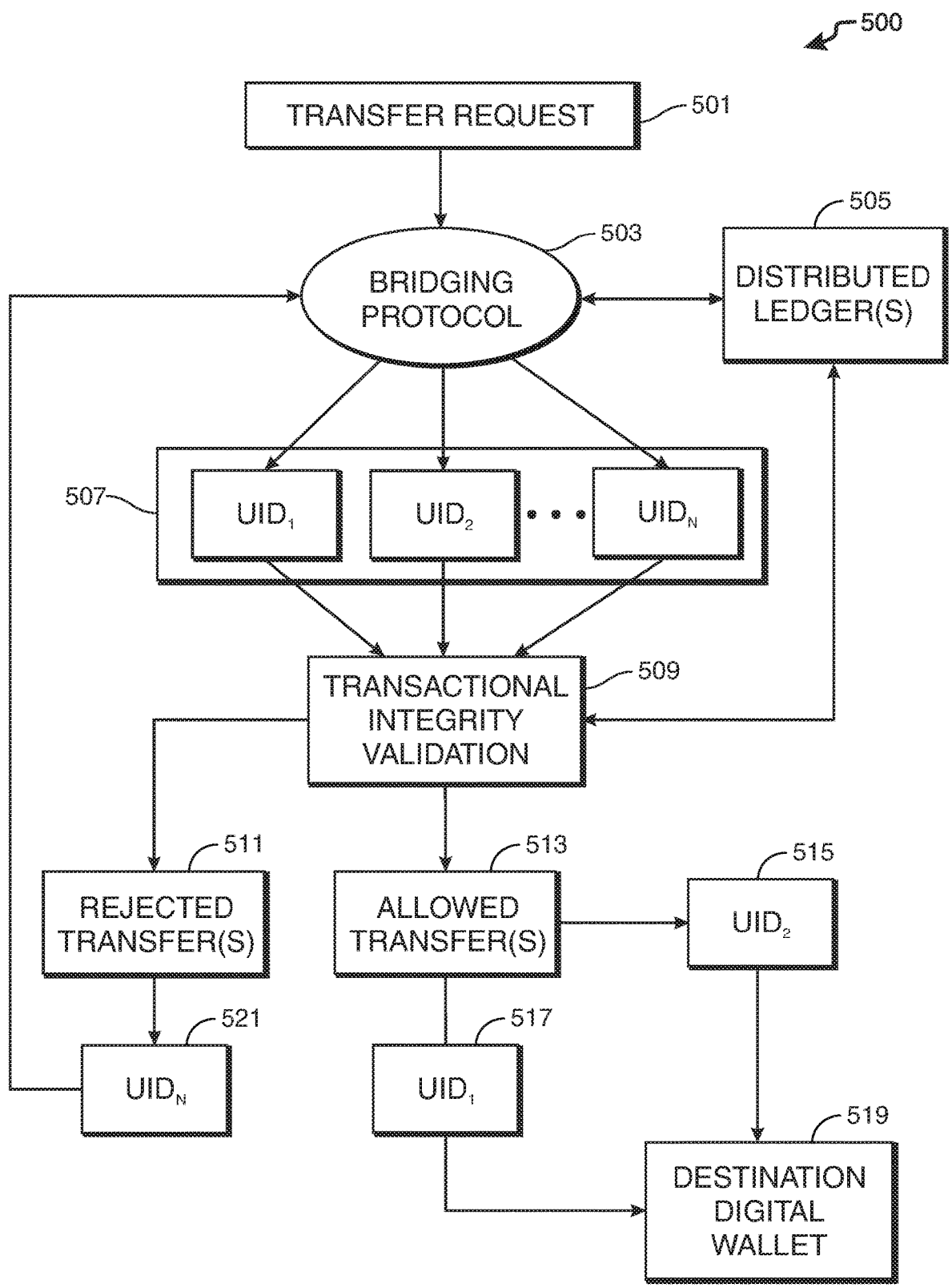
FIG. 5 shows an illustrative process in accordance with principles of the disclosure.

FIG. 5 shows illustrative process 500. One or more of the steps of the process illustrated in FIG. 5 may be performed by a "system." The "system" may include one or more of the features of the apparatus or processes shown in FIGS. 1-4 and/or any other suitable device or approach. The "system" may be provided by an entity. The entity may be an individual, an organization or any other suitable entity.

Process 500 begins at step 501. At step 501 the system receives a transfer request. At step 503 the transfer request is ingested by bridging protocol 503. At step 505 bridging protocol communicates with distributed ledgers 505. Distributed ledgers 505 record prior and current transactions processed by bridging protocol 503. Transfer request 501 may include currency that already has been assigned a unique identifier by bridging protocol 503.

Bridging protocol 503 may apply an appropriate accounting method (e.g. FIFO, LIFO) to track unique identifiers 507 associated with currency referenced in transfer request 501. At step 509, the system may perform transactional integrity validation 509. Transactional integrity validation 509 may be performed for each of unique identifiers 507 associated with transfer request 501. Transactional integrity validation 509 may include generating a map of currency flow for each of the unique identifiers 507. Transactional integrity validation 509 may include analysis of the currency flow maps.

Analysis of the currency flow maps may identify unusual, repeating patterns or other anomalous activity associated with unique identifiers 507. At step 511, the system rejects the transfer of currency associated with the movement of currency corresponding to unique identifiers 521. Currency assigned unique identifiers 521 may have a transactional integrity below a threshold level. For example, analysis of the currency flow maps for unique identifiers 521 may show anomalous or suspicion currency flow patterns.

At step 513, the system allows the transfer of currency associated with unique identifiers 517 and 515 to destination digital wallet 519. Currency assigned unique identifiers 517 and 515 may each have a transactional integrity above a threshold level. For example, analysis of the currency flow maps for unique identifiers 517 and 515 may show random flow patterns without a threshold number of repeating patterns.

Figure 6:
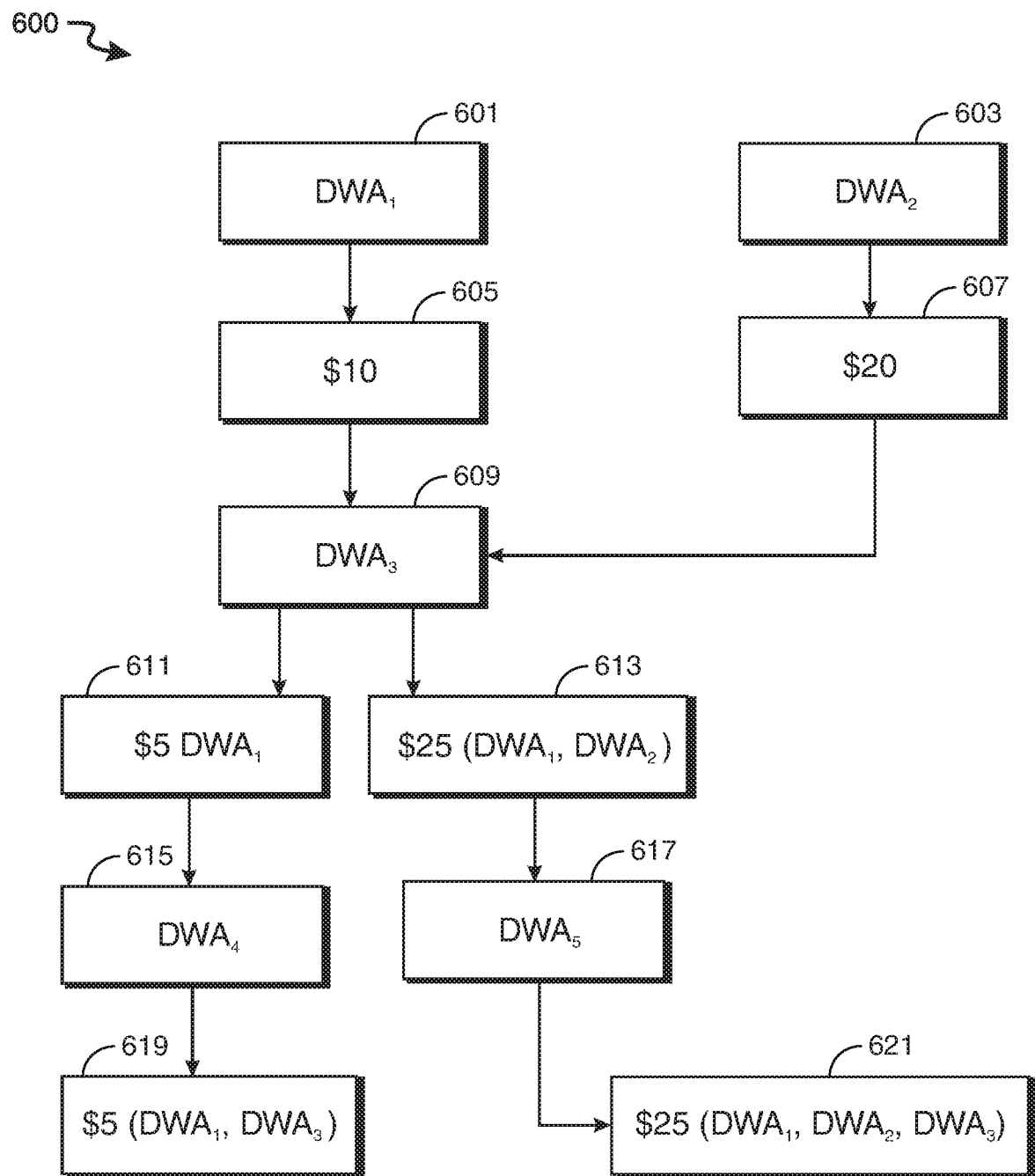
FIG. 6 shows an illustrative process in accordance with principles of the disclosure.

FIG. 6 shows illustrative currency movement 600. A bridging protocol such as bridging protocols 103 and 503, may implement currency movement 600. Movement 600 shows that destination digital wallet$_1$ ("DDWA$_1$") 601 initiates a transfer of $10 (item 605) to DDWA$_3$ (item 609). The $10 (item 605) may be assigned a first unique identifier. Movement 600 also shows that at step 603, DDWA$_2$ initiates a transfer of $20 (item 607) to DDWA$_3$. The $20 (item 607) may be assigned a second unique identifier.

At step 609, after transfers 605 and 607, DDWA$_3$ is associated with a total balance of $30. The total of 30 may be associated with two unique identifiers. At step 611, DDWA$_3$ requests a transfer of $5 to DDWA$_4$ (item 615). Step 611 also shows that the $5 selected for transfer to DDWA$_4$ is currency DDWA$_3$ received from DDWA$_1$. The $5 selected for transfer to DDWA$_4$ may be recorded as being associated with the first unique identifier. At step 613, DDWA$_3$ requests a transfer of $25 to DDWA$_5$ (item 617). Step 613 also shows that the $25 selected for transfer to DDWA$_4$ is currency DDWA$_3$ received from DDWA$_1$ and DDWA$_2$. The $25 selected for transfer to DDWA$_4$ may be associated with the first and second unique identifiers.

Step 621 shows that after DDWA$_5$ receives the $25 from DDWA$_3$, the $25 is associated with unique identifiers that trace the origin of the currency back to DDWA$_1$, DDWA$_2$ and DDWA$_3$. Step 619 shows that after DDWA$_4$ receives the $5 from DDWA$_3$, the $5 is associated with unique identifiers that trace the origin of the currency back to DDWA$_1$ via DDWA$_3$.

FIGS. 7A and 7B show illustrative transaction records that may be generated by currency movement 600 shown in FIG. 6. The transaction records may be stored in a distributed leger such as distributed ledgers 207, 401 or 505. Record 701 includes attributes evidencing the transfer of $10 from DDWA$_1$ to DDWA$_3$. Record 701 shows that the $10 transferred from DDWA$_1$ to DDWA$_3$ is associated with unique identifier ("MoneyGenesisSerialnumber") (2345-hash).

Record 703 includes attributes evidencing the transfer of $20 from DDWA$_2$ to DDWA$_3$. Record 703 shows that the $20 transferred from DDWA$_2$ to DDWA$_3$ is associated with the unique identifier (8765-hash).

Record 705 includes attributes evidencing the transfer of $5 from DDWA$_3$ to DDWA$_4$. Record 705 shows that the $5 transferred from DDWA$_3$ to DDWA$_4$ is associated with the unique identifier (2345-hash), the same unique identifier included in record 701.

Records 707 and 709 include attributes evidencing the transfer of $25 from DDWA$_3$ to DDWA$_5$. Record 707 shows that $5 transferred from DDWA$_3$ to DDWA$_5$ is associated with the unique identifier (2345-hash). Record 709 shows that $20 transferred from DDWA$_3$ to DDWA$_5$ is associated with the unique identifier (8765-hash).

Figure 8:
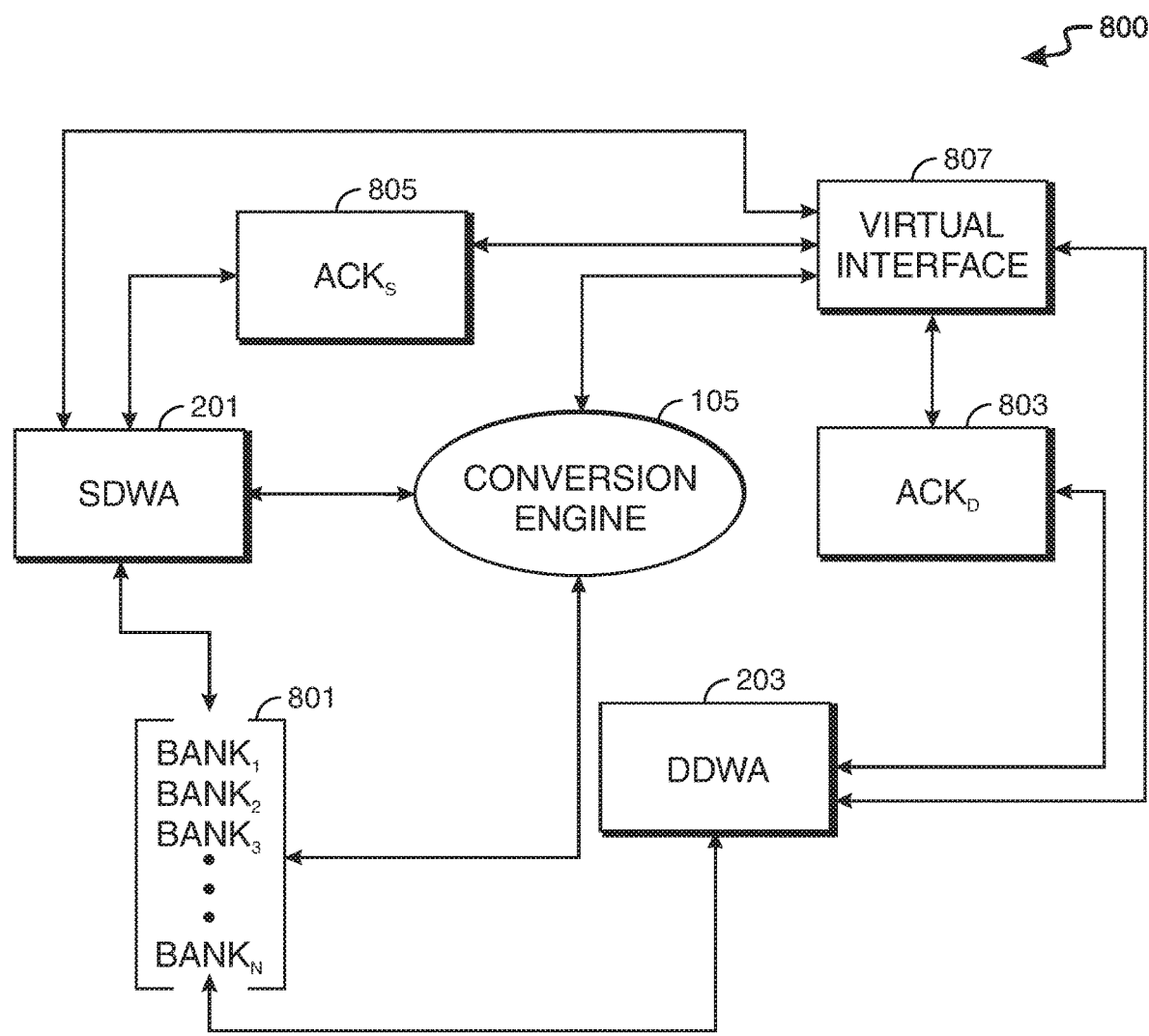
FIG. 8 shows illustrative information in accordance with principles of the disclosure.

FIG. 8 shows illustrative system 800. System 800 includes SDWA 201. SDWA 201 may transmit a currency transfer request to a bridging protocol that includes conversion engine 105. Conversion engine 105 may determine whether SDWA 201 is capable of communicating directly with DDWA 203. For example, SDWA 201 and DDWA 203 may be associated with the same digital wallet system. If SDWA 201 is unable to communicate with DDWA 203 (e.g., SDWA 201 and DDWA 203 are associated with different digital wallet systems), conversion engine 105 may utilize virtual interface 807.

Conversion engine 105 may convert the currency transfer request received from SDWA 201 into a communication may be processed by DDWA 203. Conversion engine 105 may utilize virtual interface 807 to communicate the converted currency transfer request to DDWA 203.

In response to receiving the converted currency transfer request via virtual interface 807, DDWA 203 may issue acknowledgement 803. Conversion engine 105 may receive acknowledgement 803 via virtual interface 807. Conversion engine 105 may convert acknowledgement 803 into a format understood by SDWA 201. Conversion engine 105 may transmit the converted acknowledgement to SDWA 201 via virtual interface 807.

System 800 shows that conversion engine 105 may communicate with banks 801. Banks 801 may control accounts holding currency subject to a currency request received by conversion engine 105. In addition to converting currency requests and other communication received from SDWA 201, conversion engine 801 may issue instructions to banks 801. Conversion engine 105 may issue instructions directly to banks 801. Conversion engine 105 may issue instructions to banks 801 via settlement network such as Fedwire. Conversion engine 105 may issue instructions that move currency from an account linked to SDWA 201 into an account associated with DDWA 203. Conversion engine 105 may issue instructions that move currency from an account linked to SDWA 201 into an account associated with DDWA 203 via digital holding account 107 (shown in FIG. 1).

Thus, apparatus and methods for a DIGITAL WALLET CONVERSION ENGINE are provided. Persons skilled in the art will appreciate that the present disclosure can be practiced by other than the described embodiments, which are presented for purposes of illustration rather than of limitation. The present disclosure is limited only by the claims that follow.

What is claimed is:

1. A non-transitory memory of a computer system comprising machine executable instructions, that when executed by a processor on the computer system cause the processor to:
   receive a request from a source digital wallet application using a first proprietary data and communication format to transfer currency to a destination digital wallet application;
   extract, from the request, the destination digital wallet application;
   locate the currency referenced by the source digital currency application via communication with a distributed ledger that maintains a record of funds associated with the source digital wallet application;
   transfer the currency from the source digital wallet application to a digital holding account;
   extract two or more unique identifiers previously assigned to the currency;
   verify a transactional integrity of the currency by:
      mapping a path of the currency through two or more incompatible digital wallet systems to the source digital wallet application, the path determined based on the two or more unique identifiers previously assigned to the currency;
      searching for repeating currency transfer patterns within the path of the currency, the repeating currency patterns determined based on attributes assigned to the currency by the two or more incompatible digital wallet systems, the attributes comprising, for each transfer of the currency: a source digital wallet system, a destination digital wallet system, an amount, a source digital wallet identifier, a destination digital wallet identifier, a source financial institution, a destination financial institution and a transfer date;
   when a number of detected repeating currency transfer patterns is below a threshold number:
      generate:
         a virtual instance of the destination digital wallet application executable by the processor on the computer system; and
         destination transfer instructions, that when submitted to the virtual instance of the destination digital wallet application, transfer the currency from the digital holding account to the destination digital wallet application;
      submit the destination computer executable instructions to the virtual instance of the destination digital wallet application; and
      execute the destination computer executable instructions using the virtual destination digital wallet application and thereby transfer the currency from the source digital wallet application to the destination digital wallet application; and
   when the number of detected repeating currency transfer patterns is above the threshold number, impose a time delay on delivery of the currency to the destination digital wallet application.

2. The non-transitory memory of claim 1, wherein the non-transitory memory stores additional machine executable instructions, that when executed by the processor on the computer system, cause the processor to:
   determine that the source digital wallet application utilizes a first data format;
   determine that the destination digital wallet application utilizes a second data format;
   obtain the currency from the source digital wallet application using the first data format; and
   transfer the currency to the destination digital wallet application using the second data format.

3. The non-transitory memory of claim 2 wherein the non-transitory memory stores additional machine executable instructions, that when executed by the processor on the computer system, causes the processor to:
   receive an electronic confirmation in the second data format that the currency has been received by the destination digital wallet application; and
   generate and transmit an electronic confirmation in the first data format to the source digital wallet application.

4. The non-transitory memory of claim 1 wherein the non-transitory memory stores additional machine executable instructions, that when executed by the processor on the computer system, cause the processor to return the currency to the source digital wallet application when the transactional integrity of the currency is below the threshold and after expiration of the time delay.

5. The non-transitory memory of claim 1 wherein the non-transitory memory stores additional machine executable instructions, that when executed by the processor on the computer system, cause the processor to disseminate the detected repeating transfer patterns to:
   the source digital wallet system accessible by a first interface provided by the source digital wallet application; and
   the destination digital wallet system accessible by a second interface provided by the destination digital wallet application.

6. The non-transitory memory of claim 1 wherein the non-transitory memory stores additional machine executable instructions, that when executed by the processor on the computer system, cause the processor to disseminate the repeating transfer patterns to each of the digital wallet applications identified in the mapping that participated in any transfer of the currency.

7. The non-transitory memory of claim 1 wherein the non-transitory memory stores additional machine executable instructions, that when executed by the processor on the computer system, cause the processor to:
   locate a source account holding the currency referenced by the source digital wallet application;
   locate a destination account for holding the currency on behalf of the destination digital wallet application; and
   debit the source account and credit the destination account.

8. The non-transitory memory of claim 1 wherein the non-transitory memory stores additional machine executable instructions, that when executed by the processor on the computer system, cause the processor to:
   during the time delay, receive an override instruction from the source digital wallet application; and
   in response to receiving the override instruction, transfer the currency to the second destination digital wallet application.

* * * * *